US012719198B2

(12) United States Patent
Stoyanov

(10) Patent No.: US 12,719,198 B2
(45) Date of Patent: Aug. 25, 2026

(54) MODULAR ELECTRICAL CONNECTOR

(71) Applicant: TE Connectivity Solutions GmbH, Schaffhausen (CH)

(72) Inventor: Anton Stoyanov, Winston Salem, NC (US)

(73) Assignee: TE Connectivity Solutions GmbH (CH)

( * ) Notice: Subject to any disclaimer, the term of this patent is extended or adjusted under 35 U.S.C. 154(b) by 382 days.

(21) Appl. No.: 18/419,608

(22) Filed: Jan. 23, 2024

(65) Prior Publication Data

US 2025/0239799 A1 Jul. 24, 2025

(51) Int. Cl.

*H01R 13/629* (2006.01)
*H01R 13/436* (2006.01)
*H01R 13/514* (2006.01)

(52) U.S. Cl.

CPC ....... *H01R 13/4362* (2013.01); *H01R 13/514* (2013.01); *H01R 13/62938* (2013.01); *H01R 13/62955* (2013.01)

(58) Field of Classification Search

CPC .............. H01R 13/4362; H01R 13/514; H01R 13/62938; H01R 13/62955; H01R 13/4361; H01R 13/42

See application file for complete search history.

(56) References Cited

U.S. PATENT DOCUMENTS

2003/0017733 A1* 1/2003 Fujii ................ H01R 13/62938 439/157
2005/0221647 A1* 10/2005 Dillon .............. H01R 13/62977 439/157
2007/0099461 A1* 5/2007 Pittenger .......... H01R 13/62977 439/157
2007/0232100 A1* 10/2007 Tyler ................ H01R 13/62977 439/157
2007/0293080 A1* 12/2007 Miyamoto ......... H01R 13/5205 439/352
2009/0305536 A1* 12/2009 Martin ............. H01R 13/62955 439/157
2010/0055954 A1* 3/2010 Martin ............... H01R 13/5219 439/278
2010/0081313 A1* 4/2010 Komiyama ...... H01R 13/62977 439/341
2012/0315784 A1* 12/2012 Pankau .............. H01R 13/6315 439/376
2013/0330959 A1* 12/2013 Bashkin ........... H01R 13/62955 439/372

* cited by examiner

*Primary Examiner* — Abdullah A Riyami
*Assistant Examiner* — Nelson R. Burgos-Guntin

(57) ABSTRACT

An electrical connector includes a connector housing including a mating end at a first end of the connector housing and a track at a second end of the connector housing. The electrical connector includes terminal modules received in module cavities of the connector housing. Each terminal module includes a module housing holding terminals in terminal channels, which are terminated to ends of wires. The electrical connector includes a wire cover coupled to the track. The wire cover includes a wire cavity receiving the wires from the terminal modules and directing the wires to a wire exit. The wire cover includes a module blocking wall positioned along the terminal modules to block removal of the terminal modules from the corresponding module cavities.

20 Claims, 9 Drawing Sheets

MODULAR ELECTRICAL CONNECTOR

BACKGROUND OF THE INVENTION

The subject matter herein relates generally to electrical connectors.

Electrical connectors are mated together to electrically connect various components, such as through wires. The electrical connectors including mating terminals, such as pins and sockets, connected at a separable mating interface. The electrical performance of the connectors is affected by the signal integrity at the mating interface. The signal integrity is affected by the mating depth of the male and female terminals. The connectors are designed with tight mating tolerances to control the mating depth. However, tight mating tolerances are difficult to attain, particularly with modular connectors having internal modules that add tolerances to the interfaces.

A need remains for electrical connectors having controlled mating depths to improve signal integrity.

BRIEF DESCRIPTION OF THE INVENTION

In one embodiment, an electrical connector is provided and includes a connector housing including a mating end at a first end of the connector housing. The connector housing includes module cavities separated by separating walls. The connector housing includes a track at a second end of the connector housing. The electrical connector includes terminal modules received in the corresponding module cavities. Each terminal module includes a module housing has terminal channels. Each terminal module includes terminals received in corresponding terminal channels. The terminals are terminated to ends of wires extending from a end of the corresponding module housing. The electrical connector includes a wire cover coupled to the track at the second end of the connector housing. The wire cover includes a wire cavity receiving the wires from the terminal modules. The wire cover has a wire exit. The wire cover directs the wires to the wire exit. The wire cover includes a module blocking wall positioned along the terminal modules to block removal of the terminal modules from the corresponding module cavities.

In another embodiment, an electrical connector is provided and includes a connector housing including a mating end at a first end of the connector housing configured to be mated with a mating electrical connector. The connector housing includes module cavities separated by separating walls. The connector housing includes a track at a second end of the connector housing. The electrical connector includes a lever rotatably coupled to the connector housing and movable between an open position and a closed position. The lever configured to be securely coupled to the mating electrical connector in the closed position. The electrical connector includes terminal modules received in the corresponding module cavities. Each terminal module includes a module housing has terminal channels. Each terminal module includes terminals received in corresponding terminal channels. The terminals are terminated to ends of wires extending from a end of the corresponding module housing. The electrical connector includes a wire cover coupled to the track at the second end of the connector housing. The wire cover includes a wire cavity receiving the wires from the terminal modules. The wire cover has a wire exit. The wire cover directs the wires to the wire exit. The wire cover includes a module blocking wall positioned along the terminal modules to block removal of the terminal modules from the corresponding module cavities. The wire cover includes a locking lever configured to be coupled to the lever to retain the lever in the closed position.

In a further embodiment, an electrical connector system is provided and includes a first electrical connector coupled to a second electrical connector. The first electrical connector includes a first connector housing includes a mating end at a first end of the first connector housing for mating with the second electrical connector. The first connector housing includes first module cavities separated by first separating walls. The first connector housing includes a first track at a second end of the first connector housing. The first electrical connector includes first terminal modules received in the corresponding first module cavities. Each first terminal module includes a first module housing has first terminal channels. Each first terminal module includes first terminals received in corresponding first terminal channels. The first terminals are terminated to ends of first wires extending from a end of the corresponding first module housing, and the first electrical connector includes a first wire cover coupled to the first track at the second end of the first connector housing. The first wire cover includes first a wire cavity receiving the first wires from the first terminal modules. The first wire cover has a first wire exit. The first wire cover directs the first wires to the first wire exit. The first wire cover includes a first module blocking wall positioned along the first terminal modules to block removal of the first terminal modules from the corresponding first module cavities. The second electrical connector includes a second connector housing includes a mating end at a first end of the second connector housing for mating with the first electrical connector. The second connector housing includes second module cavities separated by second separating walls. The second connector housing includes a second track at a second end of the second connector housing. The second electrical connector includes second terminal modules received in the corresponding second module cavities. Each second terminal module includes a second module housing has second terminal channels. Each second terminal module includes second terminals received in corresponding second terminal channels. The second terminals mated with the corresponding first terminals. The second terminals are terminated to ends of second wires extending from a end of the corresponding second module housing, and the second electrical connector includes a second wire cover coupled to the second track at the second end of the second connector housing. The second wire cover includes second a wire cavity receiving the second wires from the second terminal modules. The second wire cover has a second wire exit. The second wire cover directs the second wires to the second wire exit. The second wire cover includes a second module blocking wall positioned along the second terminal modules to block removal of the second terminal modules from the corresponding second module cavities.

DETAILED DESCRIPTION OF THE INVENTION

Figure 1:
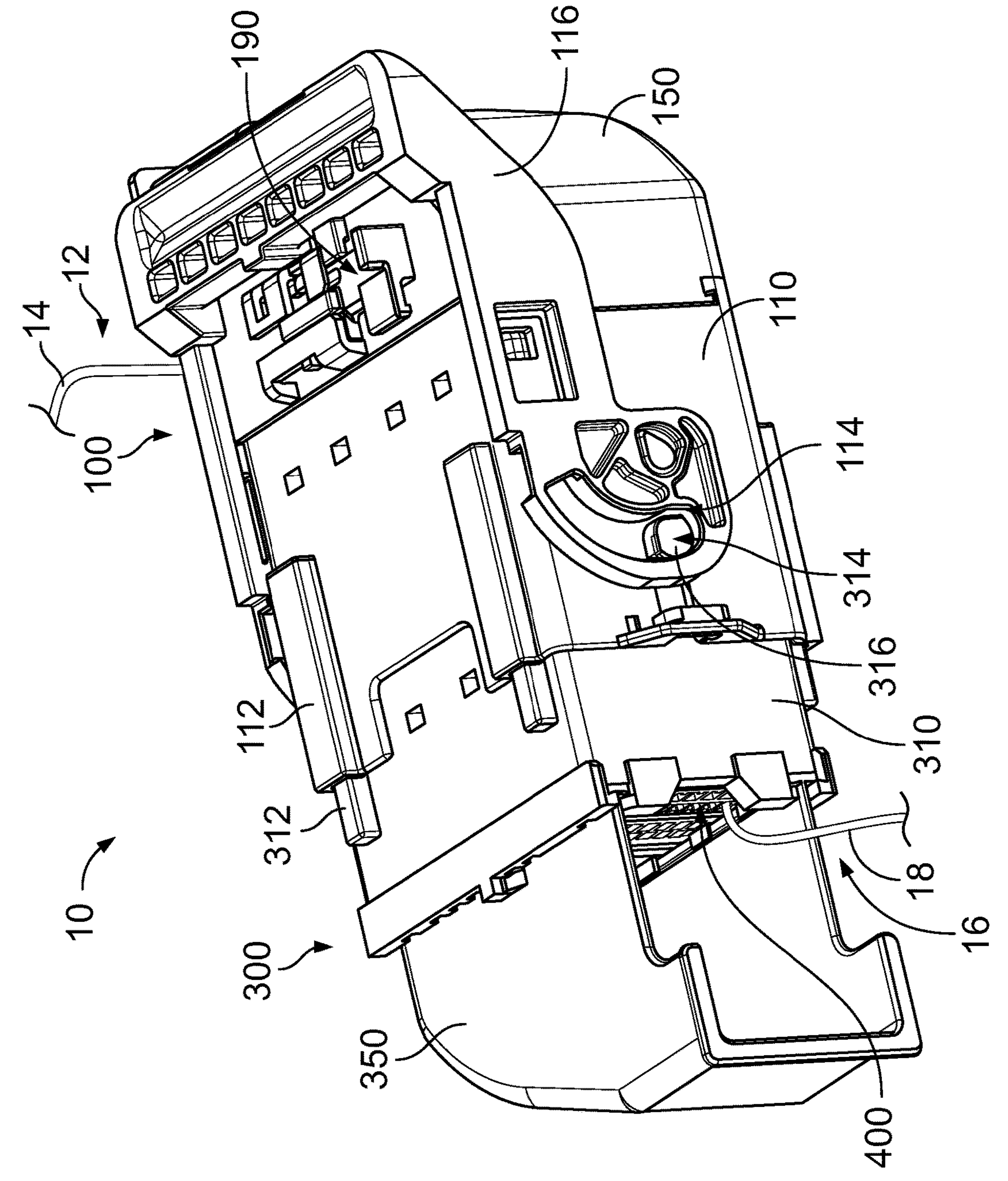
FIG. 1 is a perspective view of an electrical connector system in accordance with an exemplary embodiment.

FIG. 1 is a perspective view of an electrical connector system 10 in accordance with an exemplary embodiment. The electrical connector system 10 includes a first electrical connector 100 and a second electrical connector 300 mated with the first electrical connector 100. The second electrical connector 300 is a mating electrical connector for the first electrical connector 100, and vice versa. In an exemplary embodiment, the second electrical connector 300 is a plug connector configured to be plugged into the first electrical connector 100. In an exemplary embodiment, the first electrical connector 100 is a receptacle connector configured to receive the second electrical connector 300.

In an exemplary embodiment, the first electrical connector 100 is a cable connector having one or more cables 12 extending therefrom. Each cable 12 may have one or more wires 14 arranged in a bundle forming the cable 12. In an exemplary embodiment, the second electrical connector 300 is a cable connector having one or more cables 16 extending therefrom. Each cable 16 may have one or more wires 18 arranged in a bundle forming the cable 16. In an alternative embodiment, the first electrical connector 100 and/or the second electrical connector 300 may be a board connector configured to be mounted to a circuit board. In various embodiments, the first electrical connector 100 and/or the second electrical connector 300 may be mounted to another component, such as to a wall or panel.

Figure 2:
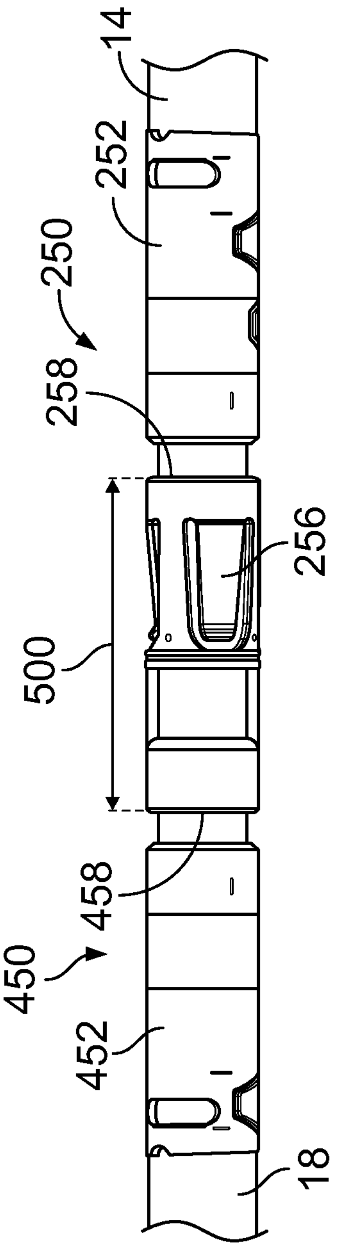
FIG. 2 illustrates a portion of the electrical connector system showing portions of the terminals coupled together in accordance with an exemplary embodiment.
Figure 3:
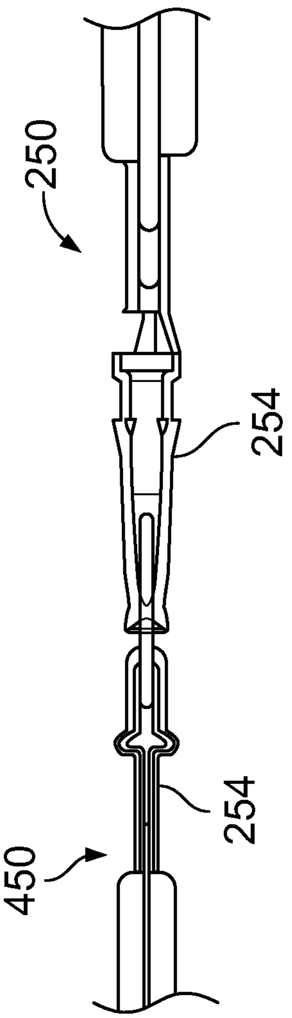
FIG. 3 illustrates a portion of the electrical connector system showing portions of the terminals coupled together in accordance with an exemplary embodiment.

The first electrical connector 100 includes a connector housing 110 configured to hold one or more terminals 250 (shown in FIGS. 2 and 3). The terminals 250 are terminated to ends of corresponding wires 14. In an exemplary embodiment, the electrical connector 100 is a modular connector holding one or more terminal modules 200 (shown in FIG. 4). Each terminal module 200 is configured to hold one or more of the terminals 250.

The second electrical connector 300 includes a connector housing 310 configured to hold one or more terminals 450 (shown in FIGS. 2 and 3). The terminals 450 are terminated to ends of corresponding wires 18. In an exemplary embodiment, the electrical connector 100 is a modular connector holding one or more terminal modules 400. Each terminal module 400 is configured to hold one or more of the terminals 450.

In an exemplary embodiment, the first electrical connector 100 includes guide features 112 and the second electrical connector 300 includes guide features 312 to guide mating of the first and second electrical connectors 100, 300. In the illustrated embodiment, the guide features 312 are guide ribs and the guide features 112 are guide channels that receive the guide ribs. Other types of guide features may be used in alternative embodiments. Optionally, the guide features 112, 312 may be polarizing or keying features for keyed mating of the first and second electrical connectors 100, 300.

In an exemplary embodiment, the first electrical connector 100 includes securing features 114 and the second electrical connector 300 includes securing features 314 to secure the first and second electrical connectors 100, 300 together when mated. The securing features 114, 314 may include latches, clips, fasteners, or other types of securing features. In an exemplary embodiment, the securing features 314 include locking lobes 316 extending outward from sides of the connector housing 310 to interface with the securing features 114 of the first electrical connector 100. In an exemplary embodiment, the securing features 114 of the first electrical connector 100 include a locking lever 116 rotatably coupled to the connector housing 110. The locking lever 116 interfaces with the locking lobes 316 to secure the first and second electrical connectors 100, 300. Optionally, the locking lever 116 is used to drive mating of the first and second electrical connectors 100, 300 as the locking lever 116 is rotated to the final or closed position. For example, rotational movement of the locking lever 116 causes axial movement of the connector housings 110, 310 relative to each other to force the connector housings 110, 310 toward each other to a final mated position.

In an exemplary embodiment, the first electrical connector 100 includes a wire cover 150 coupled to the connector housing 110. The wire cover 150 covers the wires 14 extending from the first electrical connector 100. The wire cover 150 is used to guide or organize the wires 14 at the cable exit. For example, the wire cover 150 controls the exit direction of the wires 14 from the first electrical connector 100. In an exemplary embodiment, the wire cover 150 is located behind the terminal modules 200 to hold the terminal modules 200 in the connector housing 110. In an exemplary embodiment, the wire cover 150 is configured to forward bias the terminal modules 200 in the connector housing 110 to ensure proper positioning of the terminals 250 relative to the connector housing 110 for mating with the second electrical connector 300. The wire cover 150 blocks removal of the terminal modules 200 from the connector housing 110. For example, the wire cover 150 operates as an independent secondary locking device for the terminal modules 200 to retain the terminal modules 200 in the connector housing 110. In an exemplary embodiment, the wire cover 150 operates as a module position assurance device to ensure that the terminal modules 200 are fully loaded into the connector housing 110. For example, the wire cover 150 may be unable to be properly coupled to the connector housing 110 if any of the terminal modules 200 are improperly loaded into the connector housing 110. For example, the wire cover 150 is configured to be coupled to the connector housing 110 only when all of the terminal modules 200 are fully loaded into the connector housing 110. In an exemplary embodiment, the wire cover 150 houses a component position assurance device 190 that ensures that the locking lever 116 is in the final or closed position to ensure that the first and second electrical connectors 100, 300 are fully mated.

In an exemplary embodiment, the second electrical connector 300 includes a wire cover 350 coupled to the connector housing 310. The wire cover 350 covers the wires 18 extending from the second electrical connector 300. The wire cover 350 is used to guide or organize the wires 18 at the cable exit. For example, the wire cover 350 controls the exit direction of the wires 18 from the second electrical connector 300. In an exemplary embodiment, the wire cover 350 is located behind the terminal modules 400 to hold the terminal modules 400 in the connector housing 310. In an exemplary embodiment, the wire cover 350 is configured to forward bias the terminal modules 400 in the connector housing 310 to ensure proper positioning of the terminals 450 relative to the connector housing 310 for mating with the second electrical connector 300. The wire cover 350 blocks removal of the terminal modules 400 from the connector housing 310. For example, the wire cover 350 operates as an independent secondary locking device for the terminal modules 400 to retain the terminal modules 400 in the connector housing 310. In an exemplary embodiment, the wire cover 350 operates as a module position assurance device to ensure that the terminal modules 400 are fully loaded into the connector housing 310. For example, the wire cover 350 may be unable to be properly coupled to the connector housing 310 if any of the terminal modules 400 are improperly loaded into the connector housing 310. For example, the wire cover 350 is configured to be coupled to the connector housing 310 only when all of the terminal modules 400 are fully loaded into the connector housing 310.

FIG. 2 illustrates a portion of the electrical connector system 10 showing portions of the terminals 250, 450 coupled together in accordance with an exemplary embodiment. FIG. 3 illustrates a portion of the electrical connector system 10 showing portions of the terminals 250, 450 coupled together in accordance with an exemplary embodiment. FIG. 2 illustrates outer contacts 252, 452 of the terminals 250, 450 coupled together. FIG. 3 illustrates inner contacts 254, 454 of the terminals 250, 450 coupled together. In an exemplary embodiment, the outer contacts 252, 452 are ground or shield contacts for the inner contacts 254, 454.

The inner contacts 254, 454 are terminated to ends of center conductors of the wires 14, 18, respectively. For example, the inner contacts 254, 454 may be crimped to the ends of the conductors of the wires 14, 18. In the illustrated embodiment, the inner contact 254 is a socket contact in the inner contacts 454 is a pin contact. Other types of contacts may be used in alternative embodiments. The inner contacts 254, 454 are configured to be held in the outer contacts 252, 452 using insulators to electrically isolate the inner contacts 254, 454 from the outer contacts 252, 452.

The outer contacts 252, 452 are terminated to ends of the wires 14, 18, respectively. For example, the outer contacts 252, 452 may be crimped to cable shields of the wires 14, 18. The end of the outer contact 452 may be plugged into the end of the outer contact 252. In the illustrated embodiment, the outer contact 252 includes spring beams or fingers 256 configured to engage the outer surface of the outer contact 452. In an exemplary embodiment, the outer contacts 252, 452 include datum surfaces 258, 458. The datum surfaces 258, 458 are configured to be held in the terminal modules 200, 400 at particular locations. For example, the terminal modules 200, 400 may include locating elements, such as latches that engage the datum surfaces 258, 458, respectively, to hold the terminals 250, 450 at particular locations within the terminal modules 200, 400. When the electrical connectors 100, 300 are mated, the datum surfaces 258, 458 are located at predetermined positions (within a particular tolerance) to control signal integrity and performance of the electrical connector system 10. For example, the datum surfaces 258, 458 are configured to be located a predetermined distance 500 from each other, which ensures proper mating of the terminals 250, 450.

Figure 4:
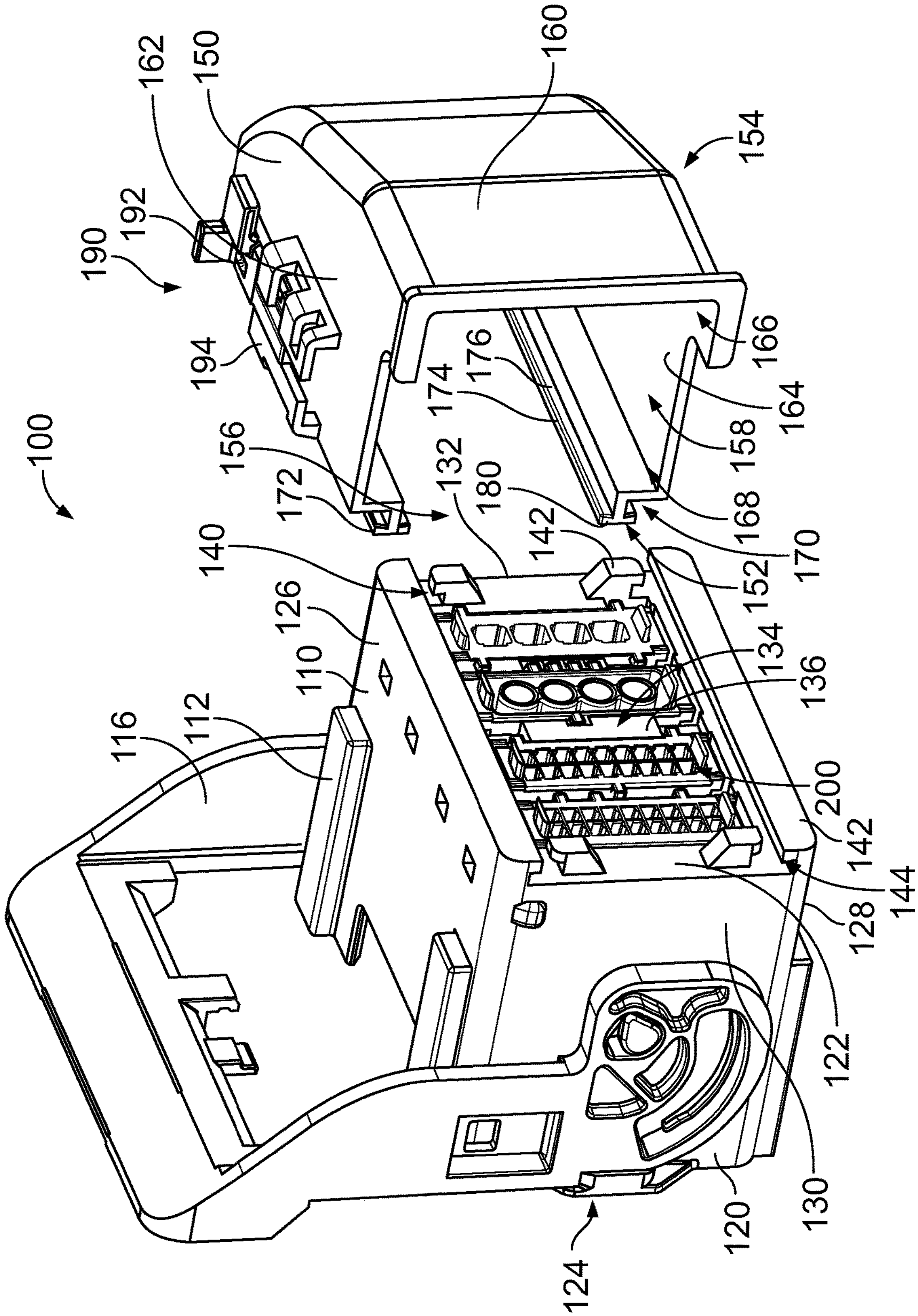
FIG. 4 is a rear perspective, exploded view of the electrical connector in accordance with an exemplary embodiment.
Figure 5:
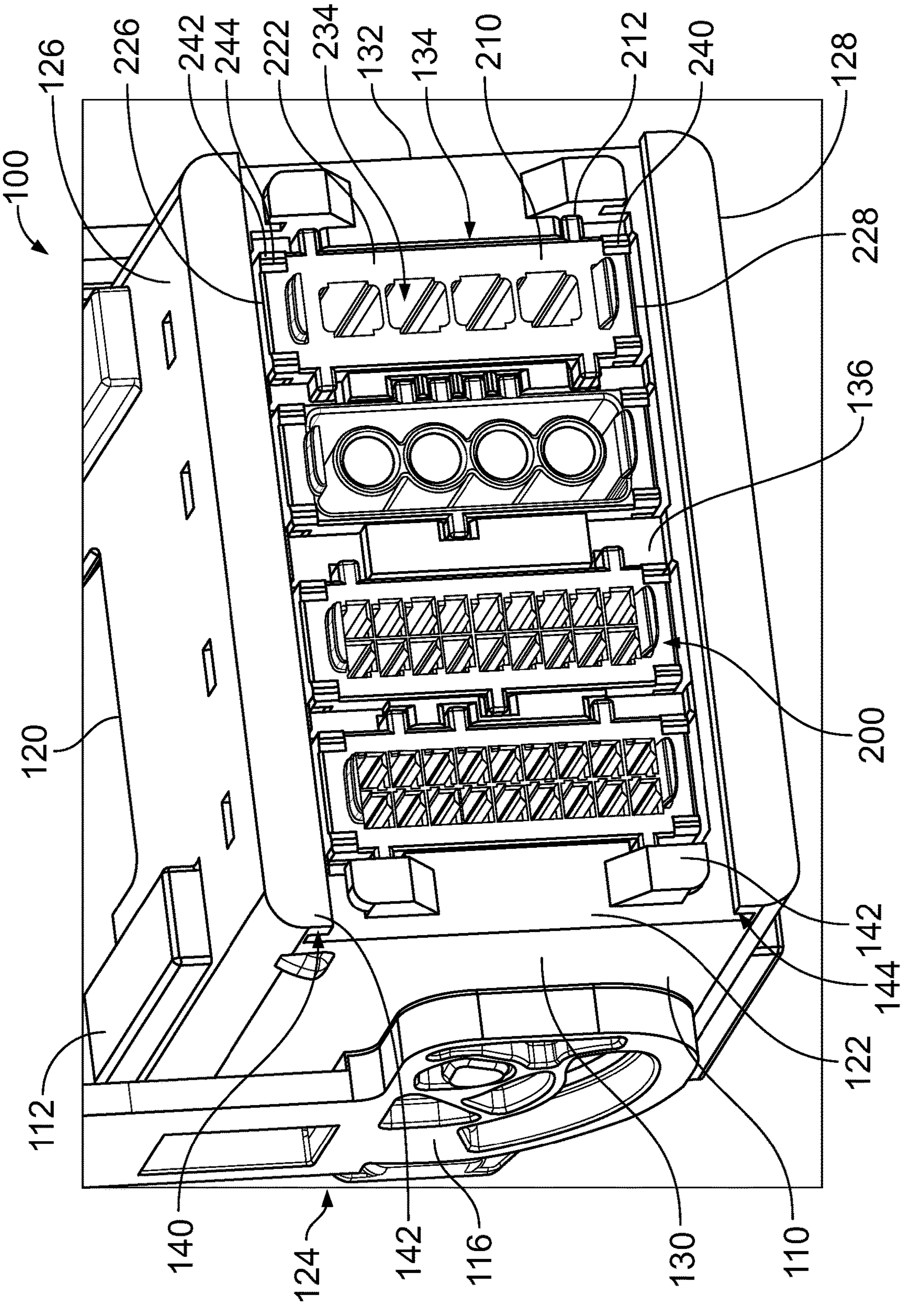
FIG. 5 is a rear perspective view of a portion of the electrical connector in accordance with an exemplary embodiment.

FIG. 4 is a rear perspective, exploded view of the electrical connector 100 in accordance with an exemplary embodiment. FIG. 5 is a rear perspective view of a portion of the electrical connector 100 in accordance with an exemplary embodiment. FIGS. 4 and 5 illustrate the terminal modules 200 loaded into the connector housing 110. FIG. 4 shows the wire cover 150 poised for coupling to the connector housing 110.

The connector housing 110 extends between a front 120 and a rear 122. In an exemplary embodiment, the front 120 defines a mating end 124 of the connector housing 110 configured to be mated with the second electrical connector 300. In an exemplary embodiment, the wire cover 150 is coupled to the rear 122 of the connector housing 110. The wires 14 are configured to exit the connector housing 110 at the rear 122. The connector housing 110 includes a top 126 and a bottom 128. In the illustrated embodiment, the top 126 and the bottom 128 are planar and parallel to each other. However, the top 126 and/or the bottom 128 may be nonplanar and were nonparallel to each other in alternative embodiments. The connector housing 110 includes a first side 130 and a second side 132 extending between the top 126 and the bottom 128. In the illustrated embodiment, the sides 130, 132 are planar and parallel to each other. However, the sides 130, 132 may be nonplanar and/or nonparallel to each other in alternative embodiments. In the illustrated embodiment, the connector housing 110 is generally box shaped. The connector housing 110 may have other shapes in alternative embodiments.

In an exemplary embodiment, the guide features 112 are located on the top 126 and or the bottom 128. For example, the guide features 112 are pockets or channels formed by shrouds at the top 126 and the bottom 128. Other types of guide features 112 may be used in alternative embodiments. In an exemplary embodiment, the locking lever 116 is coupled to the sides 130, 132 of the connector housing 110. The locking lever 116 is pivotably coupled to axles extending from the sides 130, 132. In the illustrated embodiment, the handle of the locking lever 116 is located above the connector housing 110. Other positions are possible in alternative embodiments.

In an exemplary embodiment, the connector housing 110 includes module cavities 134 that receive the corresponding terminal modules 200. The module cavities 134 are separated by separating walls 136. In the illustrated embodiment, the module cavities 134 are located between the top 126 and the bottom 128 of the connector housing 110. The separating walls 136 are oriented parallel to the sides 130, 132 2 divide the connector housing 110 into the module cavities 134. In the illustrated embodiment, the connector housing 110 includes four of the module cavities 134 that receive the corresponding terminal modules 200. Greater or fewer module cavities 134 may be used in alternative embodiments including a single module cavity.

Figure 6:
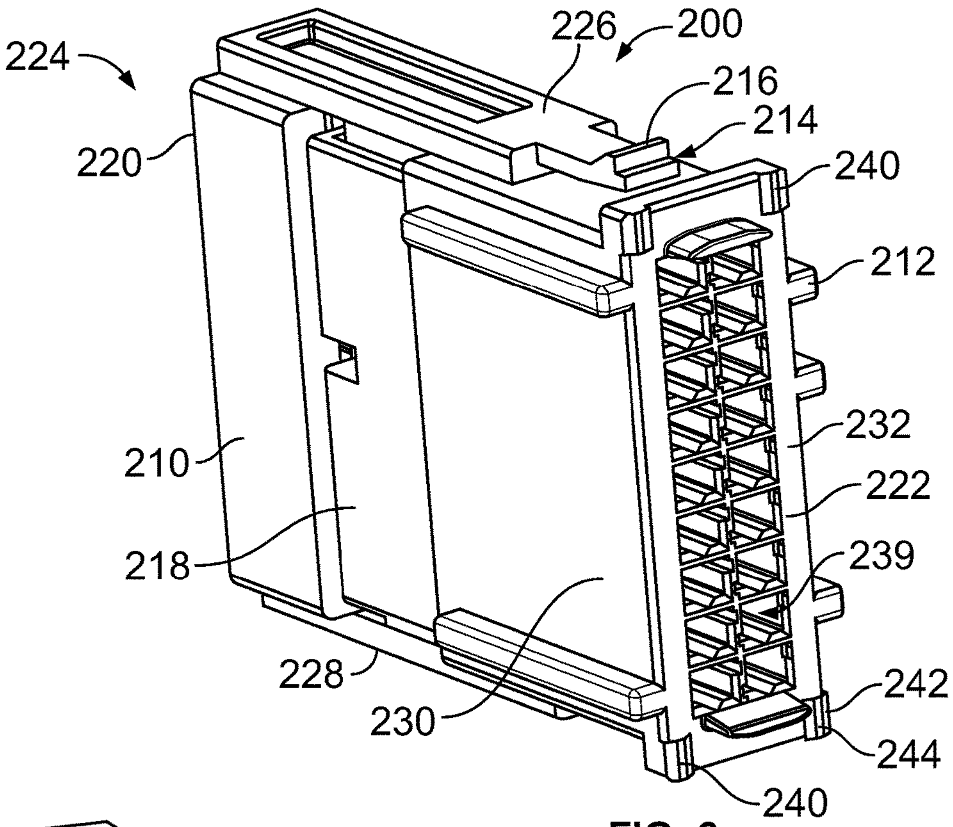
FIG. 6 is a rear perspective view of a terminal module in accordance with an exemplary embodiment.
Figure 7:
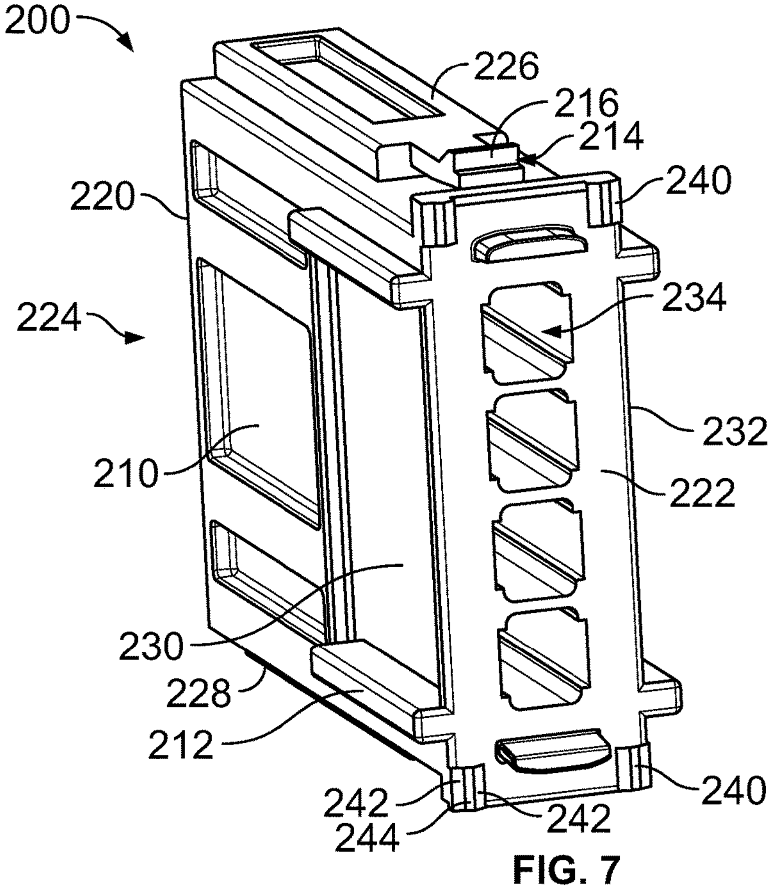
FIG. 7 is a rear perspective view of another terminal module in accordance with an exemplary embodiment.

With additional reference to FIGS. 6 and 7, FIG. 6 is a rear perspective view of a terminal module 200 in accordance with an exemplary embodiment and FIG. 7 is a rear perspective view of another terminal module 200 in accordance with an exemplary embodiment. The various terminal modules 200 are modular in design to allow different types of the terminal modules 200 to be picked and placed into the connector housing 110 depending on the particular application. For example, the various terminal modules 200 may have similar outer dimensions and features for locating the terminal modules 200 in the module cavities 134 of the connector housing 110. However, the internal features of the various terminal modules 200 may differ from each other. For example, the various terminal modules 200 may hold different types of terminals 250, different sized terminals 250, a different number of the terminals 250, and the like to change the mating configuration of the terminal modules 200 relative to each other.

Each terminal module 200 includes a module housing 210. The module housing 210 includes guide features 212 to guide loading of the terminal module 200 into the module cavity 134 of the connector housing 110. In the illustrated embodiment, the guide features 212 include one or more rails formed on one or more of the sides of the module housing 210. Optionally, the guide features 212 may be sized and/or positioned to define polarizing or keying features for keyed mating with the connector housing 110. In an exemplary embodiment, each terminal module 200 includes securing features 212 to secure the module housing 210 in the module cavity 134. In the illustrated embodiment, the securing features 214 include deflectable latches 216 configured to be latchably coupled to the connector housing 110 to hold the terminal module 200 in the module cavity 134. Optionally, the latches 216 may be located at the top and the bottom of the module housing 210. Other locations are possible in alternative embodiments. In an exemplary embodiment, the terminal module 200 may include one or more terminal latches 218 that are used to secure the terminals 250 in the module housing 210. The terminal latches 218 may extend into the interior of the module housing 210 to interface with the terminals 250 to hold the terminals 250 in the module housing 210.

In an exemplary embodiment, the module housing 210 extends between a front 220 and a rear 222. In an exemplary embodiment, the front 220 defines a mating end 224 of the module housing 210 configured to be mated with the second electrical connector 300. The wires 14 may extend from the rear 222 of the module housing 210. The module housing 210 includes a top 226 and a bottom 228. In the illustrated embodiment, the top 226 and the bottom 228 are planar and parallel to each other. However, the top 226 and/or the bottom 228 may be nonplanar and were nonparallel to each other in alternative embodiments. The module housing 210 includes a first side 230 and a second side 232 extending between the top 226 and the bottom 228. In the illustrated embodiment, the sides 230, 232 are planar and parallel to each other. However, the sides 230, 232 may be nonplanar and/or nonparallel to each other in alternative embodiments. In the illustrated embodiment, the module housing 210 is generally box shaped. The module housing 210 may have other shapes in alternative embodiments.

In an exemplary embodiment, the guide features 212 are located on the sides 230, 232. For example, the guide features 212 are ribs extending from the sides 230, 232. The sides may include different numbers and/or positions of the guide features 212. Other types of guide features 212 may be used in alternative embodiments. In an exemplary embodiment, the latches 216 are located at the top 226 and the bottom 228. Other positions are possible in alternative embodiments.

In an exemplary embodiment, the module housing 210 includes terminal cavities 234 that receive the corresponding terminals 250. In the illustrated embodiment, the terminal cavities 234 are arranged in one or more columns and one or more rows. The number of terminal cavities corresponds to the number of terminals 250. The terminal cavities 234 may have different sizes to accommodate different size terminals 250.

In an exemplary embodiment, each module housing 210 includes one or more bias bumps 240 at the rear 222 of the module housing 210. The bias bumps 240 protrude rearward from the rear 222 of the module housing 210. The bias bumps 240 are configured to interface with the wire cover 150 to forward bias the terminal module 200 in the module cavity 134 of the connector housing 110. In an exemplary embodiment, each bias bump 240 forward includes a ramp 242 and a seat 244 at the distal end of the bias bump 240. The ramp 242 extends from the rear 222 of the module housing 210 to the seat 244. Optionally, ramps 242 may be located on both sides of the seat 244. The ramp 242 is an angled surface angled relative to the rear 222 to guide the wire cover 150 as the wire cover 150 slides along the terminal module 200. Optionally, the ramp 242 may be angled approximately 45° relative to the rear 222. In an exemplary embodiment, the seat 244 is a flat surface configured to abut against a blocking surface of the wire cover 150 when the wire cover 150 is coupled to the connector housing 110. The seat 244 may be parallel to the rear 222 and/or parallel to the sliding direction of the wire cover 150. The seat 244 is positioned a distance rearward of the rear 222 of the module housing 210. The distance corresponds to an amount that the terminal module 200 is forward biased by the wire cover 150 when assembled.

In an exemplary embodiment, the module housing 210 includes a plurality of the bias bumps 240. For example, the module housing 210 may include at least one bias bump 240 at or near the top 226 and at least one bias bump 240 at or near the bottom 228. The module housing 210 may include bias bumps 240 at both the first side 230 and the second side 232. In the illustrated embodiment, the module housing 210 includes four of the bias bumps 240, with one bias bump 240 located in the each of the corners of the module housing 210 at the rear 222. Other locations are possible in alternative embodiments.

Returning to FIGS. 4 and 5, the terminal modules 200 are configured to be loaded into the corresponding module cavities 134. For example, the terminal modules 200 may be rear loaded into the module cavities 134 through the rear 122 of the connector housing 110. The terminal modules 200 may be latchably coupled to the connector housing 110 in the module cavities 134.

In an exemplary embodiment, the connector housing 110 includes a track 140 at the rear 122. The wire cover 150 is coupled to the track 140. Optionally, the wire cover 150 may be loaded into the track 140 from the first side 130 and/or the second side 132. For example, the wire cover 150 may be slid sideways onto the connector housing 110 in the track 140. In an exemplary embodiment, the track 140 includes rails 142 defining slots 144 that form the track 140. For example, the connector housing 110 may include upper and lower rails 142 that define upper and lower slots 144 that receive the wire cover 150. The slots 144 may extend from side to side of the connector housing 110. For example, the slots 144 may be open at the first side 130 to receive the wire cover 150 and/or may be open at the second side 132 to receive the wire cover 150. The upper rails 142 are located proximate to the top 126 of the connector housing 110. The lower rails 142 are located proximate to the bottom 128 of the connector housing 110. In various embodiments, the upper and lower rails 142 define T-shaped slots 144. In other embodiments, the upper and lower rails 142 define L-shaped slots 144. The rails 142 may define slots having other shapes in alternative embodiments, such as dovetail slots. The rails 142 are configured to hold the wire cover 150 on the connector housing 110. For example, the rails 142 may prevent rearward separation of the wire cover 150 from the connector housing 110. Other types of securing features may be used to secure the wire cover 150 to the connector housing 110. For example, clips, latches, fasteners, or other types of securing features may be used to secure the wire cover 150 to the rear 122 of the connector housing 110.

The wire cover 150 is separate and discrete from the connector housing 110. The wire cover 150 is configured to be coupled to the rear 122 of the connector housing 110. The wire cover 150 includes an inner end 152 and an outer end 154. The inner end 152 is located at a front of the wire cover 150. The inner end 152 includes an opening 156 that receives the wires 14 extending from the terminal modules 200. The wire cover 150 includes a wire cavity 158. The opening 156 provides access to the wire cavity 158. The wires 14 extend into the wire cavity 158.

In an exemplary embodiment, the wire cover 150 includes a cover wall 160 at the outer end 154. The cover wall 160 is located rearward of the wire cavity 158. The wire cover 150 includes a first end wall 162 and a second end wall 164 extending between the inner end 152 and the cover wall 160. The wire cavity 158 is located between the first and second end walls 162, 164. In various embodiments, the wire cover 150 may be oriented such that the first end wall 162 is an upper wall at a top of the wire cover 150 and the second end wall 164 is a lower wall at a bottom of the wire cover 150. In other embodiments, the wire cover 150 may be oriented such that the second end wall 164 is an upper wall and a top of the wire cover 150 and the first end wall 162 is a lower wall and a bottom of the wire cover 150. For example, the wire cover 150 may be inverted 180° to couple to the connector housing 110 from the right side or from the left side of the connector housing 110. As such, the wire exit direction from the wire cover 150 may be changed by flipping over the wire cover 150 and coupling to the connector housing 110 from the opposite sides. In an exemplary embodiment, the wire cover 150 includes a wire exit 166 at one of the sides of the wire cover 150. The wire cover 150 includes an opening 168 at the sides defining the wire exit 166. The wires 14 are configured exit the wire cover 150 through the opening 168. In an exemplary embodiment, the cover wall 160 closes the opposite sides of the wire cover 150 opposite the wire exit 166. The wire cover 150 covers the wires 14 extending from the module housings 210. The wire cover 150 is used to guide or organize the wires 14 at the wire exit 166. For example, the wire cover 150 controls the exit direction of the wires 14 from the first electrical connector 100.

In an exemplary embodiment, the wire cover 150 includes a mounting bracket 170 configured to be coupled to the connector housing 110. The mounting bracket 170 is coupled to the track 140 at the rear 122 of the connector housing 110 to secure the wire cover 150 to the connector housing 110. For example, the mounting bracket 170 may be slid into the track 140 from the right side or the left side of the connector housing 110. The mounting bracket 170 is located at the inner end 152 of the wire cover 150. In an exemplary embodiment, the mounting bracket 170 includes an upper bracket member 172 and a lower bracket member 174. The upper bracket member 172 is coupled to the upper rail 142 and the lower bracket member 174 is coupled to the lower rail 142. For example, the upper bracket member 172 is received in the upper slot 144 and the lower bracket member 174 is received in the lower slot 144. In an exemplary embodiment, the mounting bracket 170 includes flanges 176 that are received in the slots 144 and coupled to the rails 142. Optionally, the flanges 176 may be T-shaped having an upper flange portion and a lower flange portion that are received in an upper slot portion and a lower slot portion of the slot 144. The flanges 176 may have other shapes in alternative embodiments, such as being L-shaped, dovetail shape, or having other shapes configured to secure the flanges 176 to the rails 142.

In an exemplary embodiment, the wire cover 150 includes one or more module blocking walls 180. The module blocking walls 180 are used to block removal of the terminal modules 200 from the connector housing 110 when the wire cover 150 is coupled to the connector housing 110. The module blocking walls 180 are configured to be positioned rearward of the terminal modules 200 to hold the terminal modules 200 in the module cavities 134. In an exemplary embodiment, the module blocking walls 180 are configured to engage the biasing bumps 240 to forward bias the terminal modules 200 in the module cavities 134 of the connector housing 110. In an exemplary embodiment, the module blocking walls 180 are located at the inner end 152 of the wire cover 150. Optionally, the module blocking walls 180 may be located at a front of the mounting bracket 170. The module blocking walls 180 may be the forwardmost surfaces of the wire cover 150. In an exemplary embodiment, the wire cover 150 includes an upper module blocking walls 180 and a lower module blocking wall 180. The upper module blocking walls is configured to block the top ends of the terminal modules 200 and the lower module blocking wall 180 is configured to block the bottom ends of the terminal modules 200.

In an exemplary embodiment, the wire cover 150 includes the component position assurance device 190. The component position assurance device 190 is provided on the first end wall 162. Optionally, the component position assurance device 190 may additionally or alternatively be provided on the second end wall 164. The component position assurance device 190 includes a slide lock 192 slidably coupled to the wire cover 150. For example, the slide lock 192 may be moved in a sliding direction between an unlocked position and an locked position. The slide lock 192 is configured to be coupled to the locking lever 116 when the locking lever 116 is closed and the slide lock 192 is moved to the locked position. In an exemplary embodiment, the component position assurance device 190 includes a shroud on the wire cover 150. The slide lock 192 is received in the shroud 194. The slide lock 192 is configured to be moved in the shroud 194. The shroud 194 is used to guide the slide lock 192 between the unlocked position and the locked position.

Figure 8:
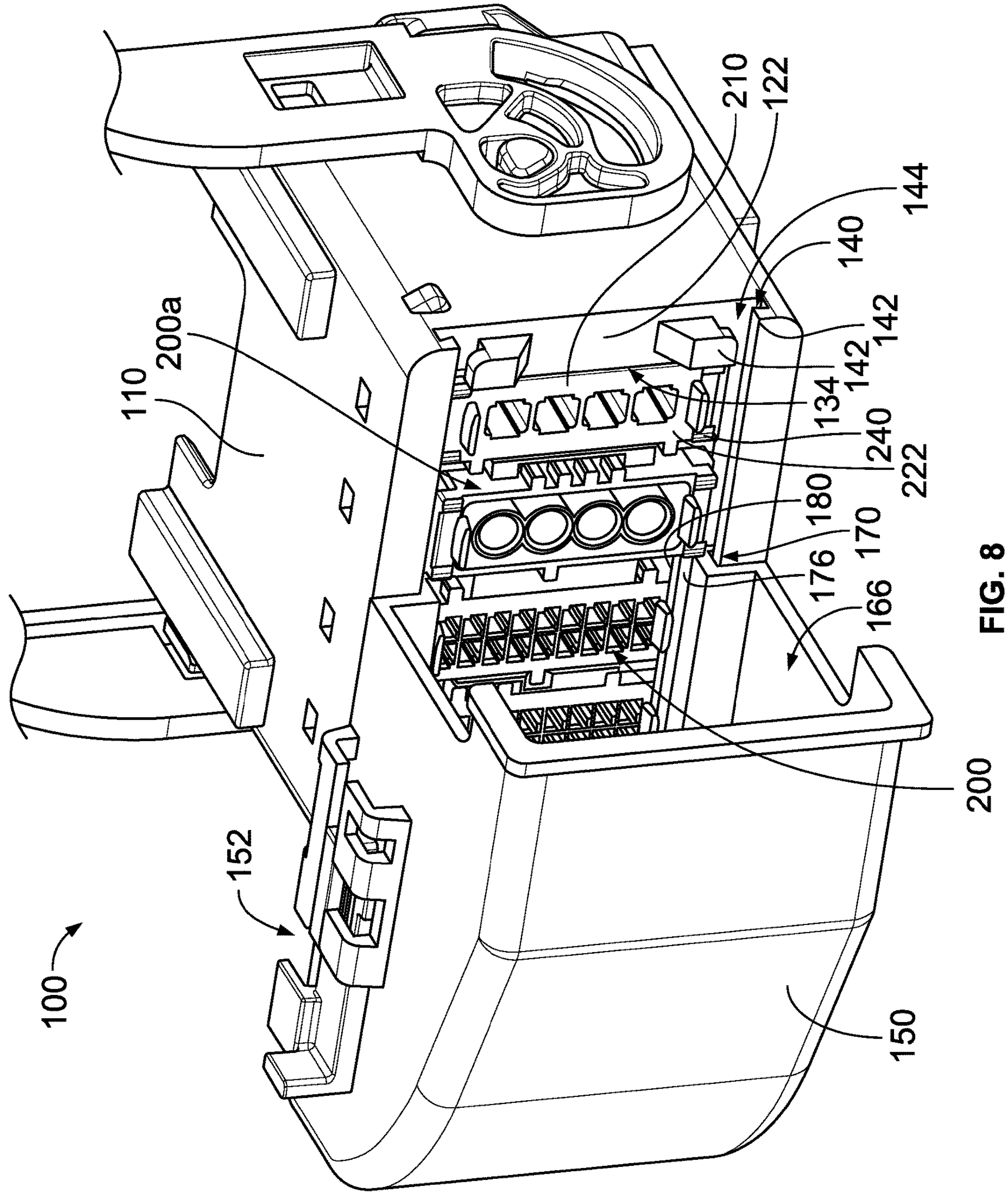
FIG. 8 is a rear perspective view of a portion of the electrical connector in accordance with an exemplary embodiment.

FIG. 8 is a rear perspective view of a portion of the electrical connector 100 in accordance with an exemplary embodiment. FIG. 8 shows the wire cover 150 partially coupled to the connector housing 110. In the illustrated embodiment, the wire cover 150 is coupled to the connector housing 110 from the left side such that the wire exit 166 is arranged at the right side of the connector housing 110.

During assembly, the wire cover 150 is coupled to the track 140 of the connector housing 110. The mounting bracket 170 at the inner end 152 of the wire cover 150 is coupled to the rails 142 at the rear 122 of the connector housing 110. For example, the mounting bracket 170 is slid sideways into the track 140. The flanges 176 of the mounting bracket 170 are received in the slots 144 defined by the rails 142 of the track 140. The rails 142 capture the flanges 176 in the slots 144 to retain the wire cover 150 on the connector housing 110. The rails 142 prevent rearward removal of the wire cover 150 from the connector housing 110.

When assembled, the wire cover 150 is located rearward of the terminal modules 200. The wire cover 150 holds the terminal modules 200 in the module cavities 134. The wire cover 150 prevents removal of the terminal modules 200 from the module cavities 134. For example, the wire cover 150 operates as an independent secondary locking device for the terminal modules 200 to retain the terminal modules 200 in the connector housing 110 independent of the latches 216 of the terminal modules 200. In an exemplary embodiment, the module blocking walls 180 engage the terminal modules 200 to hold the terminal modules 200 in the connector housing 110. The module blocking walls 180 block removal of the terminal modules 200 from the connector housing 110. In an exemplary embodiment, the module blocking walls 180 interface with the bias bumps 240 at the rears 222 of the module housing 210. When the module blocking walls 180 engage the bias bumps 240, the module housings 210 are forward biased in the module cavities 134. For example, the module housings 210 are pressed forward by the module blocking walls 180. The bias bumps 240 hold the rears 222 of the module housings 210 forward of the wire cover 150. For example, the rears 222 of the module housings 210 may be spaced apart and forward of the module blocking walls 180 with the bias bumps 240 occupying the space between the rears 222 of the module housings 210 and the module blocking walls 180. The wire cover 150 forward biases the terminal modules 200 in the connector housing 110 to ensure proper positioning of the terminals 250 relative to the connector housing 110 for mating with the second electrical connector 300.

In an exemplary embodiment, the wire cover 150 operates as a module position assurance device to ensure that the terminal modules 200 are fully loaded into the connector housing 110. For example, the wire cover 150 may be unable to be properly coupled to the connector housing 110 if any of the terminal modules 200 are improperly loaded into the connector housing 110. For example, FIG. 8 illustrates one of the terminal modules 200*a* not fully loaded into the corresponding module cavity 134. Such terminal module 200*a* protrudes rearwardly into the track 140. The wire cover 150 is unable to slide sideways in the track 140 due to the interference with the terminal module 200*a*. Such interference indicates to the installer that the terminal module 200*a* is improperly loaded into the connector housing 110, requiring action to properly load such terminal module 200*a*. The wire cover 150 may be properly coupled to the connector housing 110 after all of the terminal modules 200 are fully loaded into the connector housing 110.

Figure 9:
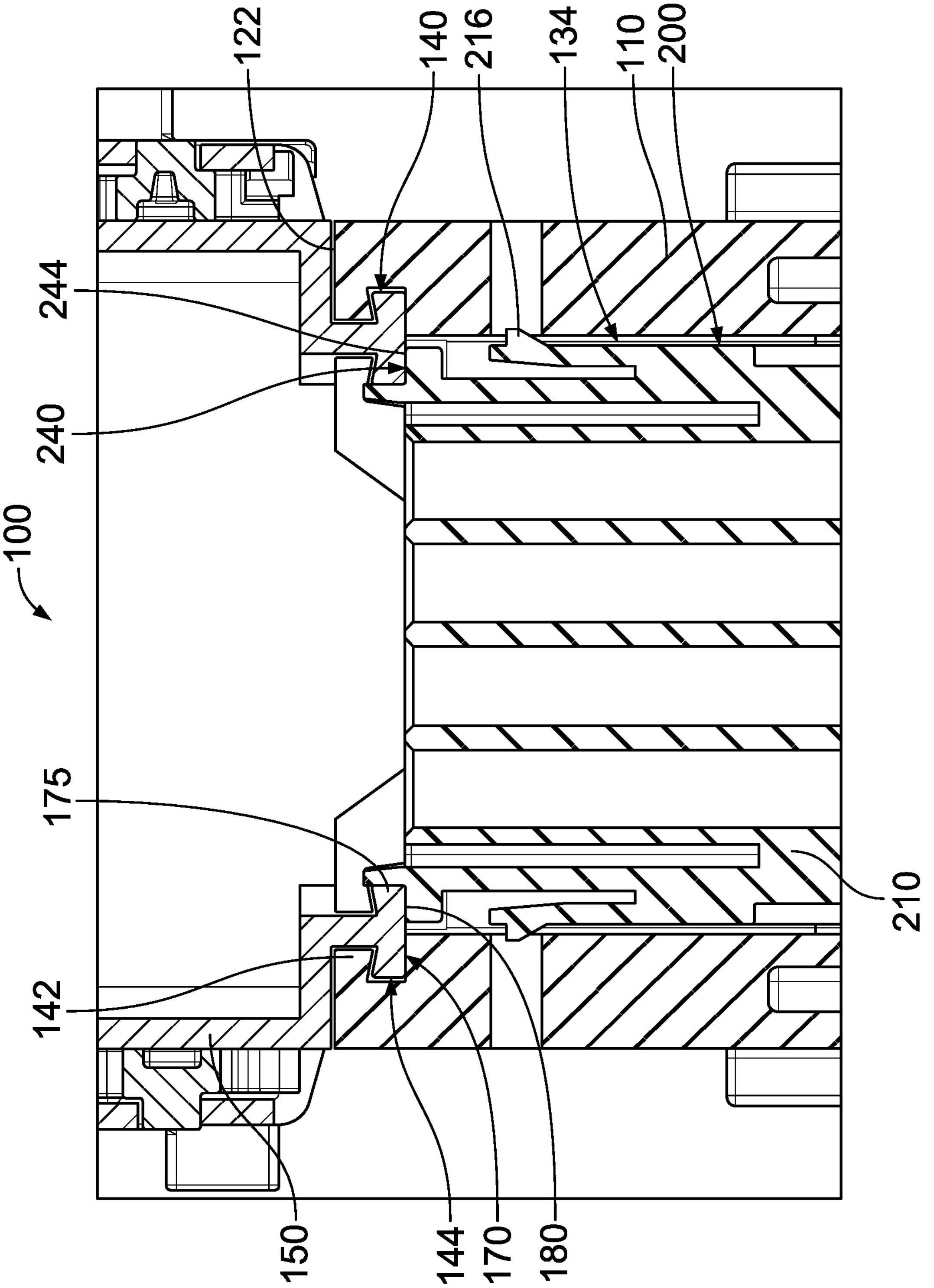
FIG. 9 is a cross-sectional view of a portion of the electrical connector showing the wire cover coupled to the connector housing and interfacing with one of the terminal modules in accordance with an exemplary embodiment.

FIG. 9 is a cross-sectional view of a portion of the electrical connector 100 showing the wire cover 150 coupled to the connector housing 110 and interfacing with one of the terminal modules 200. During assembly, the terminal module 200 is loaded into the corresponding module cavity 134. The latches 216 are used to secure the terminal module 200 in the connector housing 110. For example, the latches 216 may be latchably coupled to the connector housing 110, such as with the latches 216 are received in the latch pockets in the connector housing 110. The latches 216 define primary securing means for securing the terminal module 200 in the connector housing 110.

During assembly, the wire cover 150 is coupled to the rear 122 of the connector housing 110. For example, the mounting bracket 170 is coupled to the tract 140. The flanges 176 are received in the slots 144 and coupled to the rails 142 to secure the wire cover 150 to the connector housing 110. The module blocking walls 180 are located rearward of the terminal module 200. The module blocking walls 180 are configured to interface with the module housing 210 to retain the terminal module 200 in the module cavity 134. The module blocking walls 180 of the wire cover 150 operates as a secondary securing means for securing the terminal module 200 in the connector housing 110. In an exemplary embodiment, the module blocking walls 180 are configured to interface with the bias bumps 240 to forward bias the terminal module 200 in the connector housing 110. For example, the module blocking walls 180 engage the seats 244 of the bias bumps 240 to press the terminal module 200 in a forward direction in the module cavity 134. As such, the terminals 250, which are held by the module housing 210, are similarly moved forwardly for proper mating with the second electrical connector 300.

Figure 11:
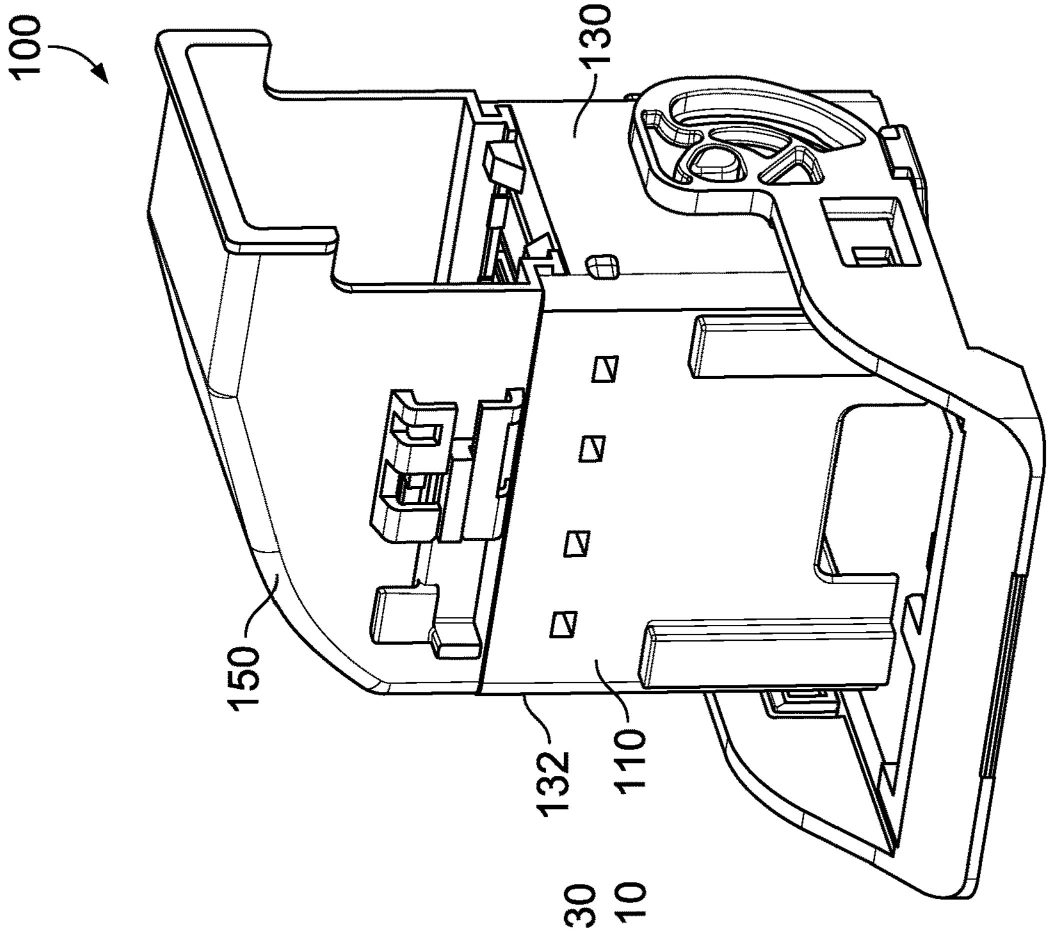
FIG. 11 is a perspective view of the electrical connector showing the wire cover having a left side wire exit in accordance with an exemplary embodiment.
Figure 10:
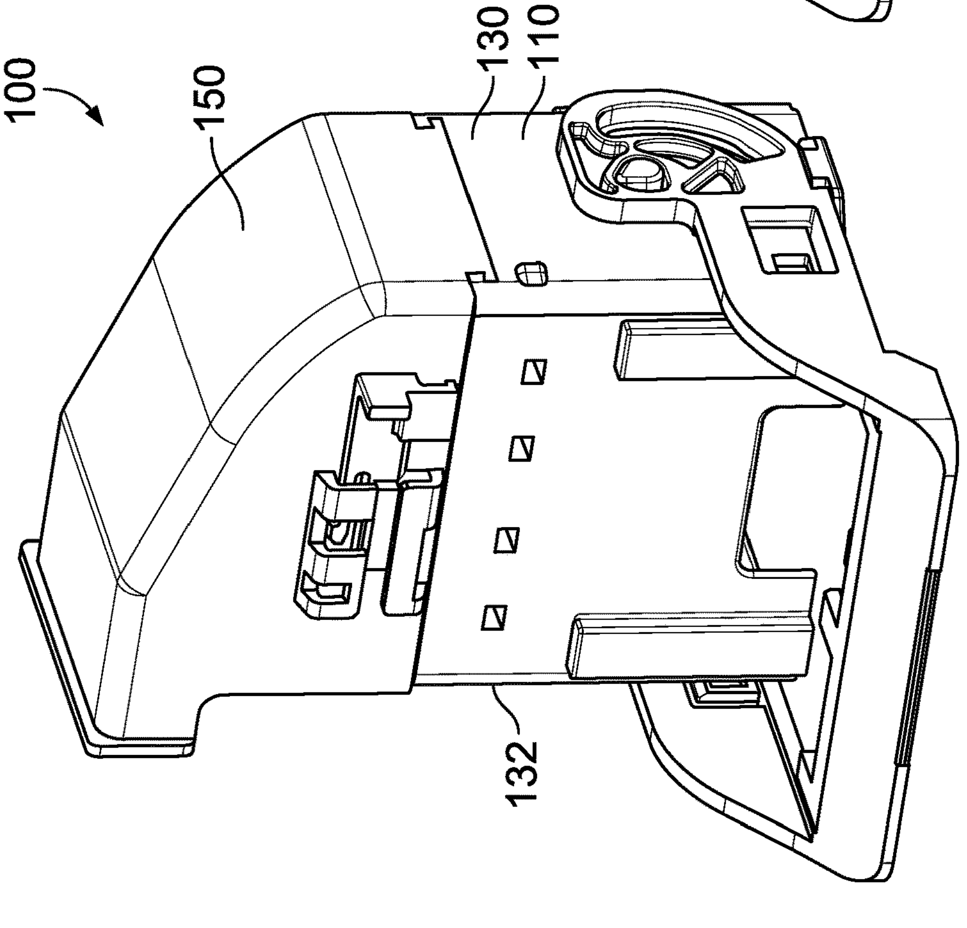
FIG. 10 is a perspective view of the electrical connector showing the wire cover having a right side wire exit in accordance with an exemplary embodiment.

FIG. 10 is a perspective view of the electrical connector 100 showing the wire cover 150 having a right side wire exit. FIG. 11 is a perspective view of the electrical connector showing the wire cover 150 having a left side wire exit. The same wire cover 150 can be coupled to the connector housing 110 in two different orientations to define the right side wire exit and the left side wire exit by rotating the wire cover 150 180°. The wire cover 150 may be slid onto the connector housing 110 from the first side 130 or the second side 132.

Figure 13:
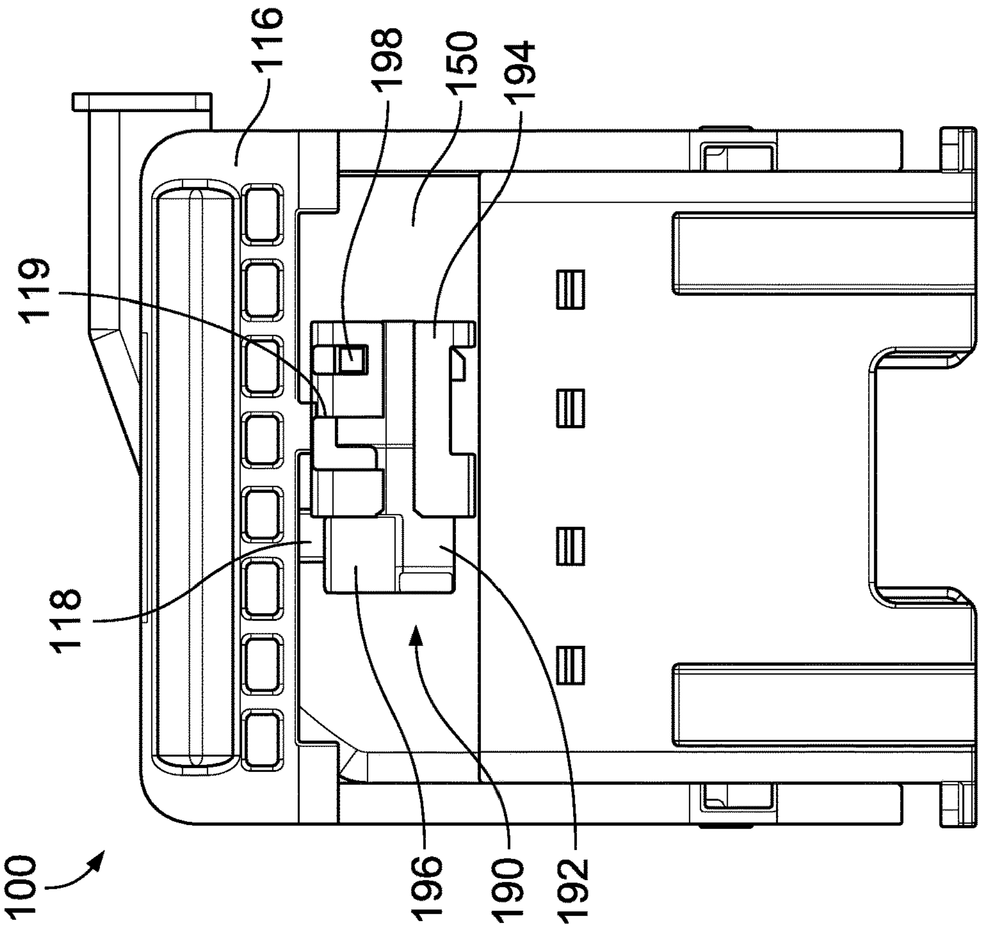
FIG. 13 is a top view of the electrical connector showing the locking lever in a closed position in accordance with an exemplary embodiment.
Figure 12:
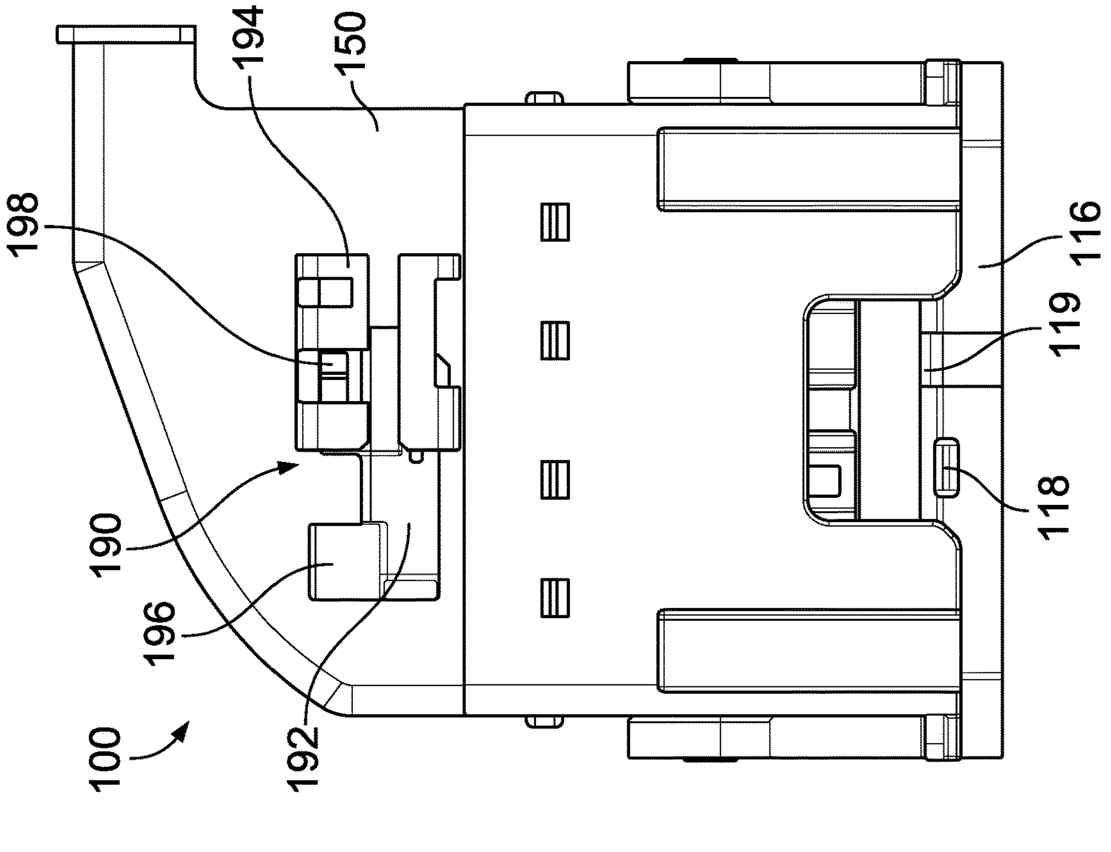
FIG. 12 is a top view of the electrical connector showing the locking lever in an open position in accordance with an exemplary embodiment.

FIG. 12 is a top view of the electrical connector 100 showing the locking lever 116 in an open position. FIG. 13 is a top view of the electrical connector 100 showing the locking lever 116 in a closed position. The locking lever 116 is configured be rotated from the open position to the closed position.

The component position assurance device 190 on the wire cover 150 is used to secure the locking lever 116 in the closed position. The slide lock 192 may be moved from the unlocked position (FIG. 12) to the locked position (FIG. 13) to interface with the locking lever 116 and secure the locking lever 116 in the closed position. In an exemplary embodiment, the slide lock 192 includes a slide locking element 196 that is configured to interface with a locking levering element 118 of the locking lever 116 when the slide lock 192 is moved to the locked position. The slide locking element 196 engages the locking levering element 118 to prevent rotation of the locking lever 116 from the closed position. For example, the locking lever 116 is unable to move from the closed position to the open position when the slide locking element 196 engages the locking levering element 118. In an exemplary embodiment, the locking lever 116 includes a release element 119 configured to engage a latch 198 of the component position assurance device 190. The latch 198 engages the shroud 194 to hold the slide lock 192 in the unlocked position. When the latch 198 is released by the release element 119, the slide lock 192 is able to move from the unlocked position to the locked position. The latch 198 may be latchably coupled to the shroud 194 in the locked position to prevent inadvertent movement of the slide lock 192 back to the unlocked position, which would allow opening of the locking lever 116. The component position assurance device 190 provides a visual indication to the installer that the locking lever 116 is secured in the closed position.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a connector housing including a mating end at a first end of the connector housing, the connector housing including module cavities separated by separating walls, the connector housing including a track at a second end of the connector housing;

terminal modules received in the corresponding module cavities, each terminal module including a module housing having terminal channels, each terminal module including terminals received in corresponding terminal channels, the terminals being terminated to ends of wires extending from an end of the corresponding module housing; and a wire cover coupled to the track at the second end of the connector housing, the wire cover including a wire cavity receiving the wires from the terminal modules, the wire cover having a wire exit, the wire cover directing the wires to the wire exit, the wire cover including a module blocking wall positioned along the terminal modules to block removal of the terminal modules from the corresponding module cavities.

2. The electrical connector of claim 1, wherein the module blocking wall forward biases the terminal modules in the module cavities.

3. The electrical connector of claim 1, wherein each module housing includes a bias bump at the end of the module housing, the module blocking wall engaging the bias bump to forward bias the terminal module in the module cavity.

4. The electrical connector of claim 3, wherein the bias bump protrudes from the end of the module housing.

5. The electrical connector of claim 3, wherein each module housing includes at least one bias bump at a top of the module housing and at least one bias bump at a bottom of the module housing.

6. The electrical connector of claim 3, wherein the bias bump includes a ramp extending from the end of the module housing to a seat of the bias bump, the module blocking wall seated on the seat of the bias bump.

7. The electrical connector of claim 3, wherein the bias bump protrudes from the end of the module housing to hold the end spaced apart from the wire cover.

8. The electrical connector of claim 1, wherein each module blocking wall engages each terminal module to hold each of the terminal modules in the corresponding module cavities.

9. The electrical connector of claim 1, wherein the wire cover includes a mounting bracket received in the track of the connector housing to secure the wire cover to the connector housing.

10. The electrical connector of claim 9, wherein the mounting bracket includes the module blocking wall.

11. The electrical connector of claim 1, wherein the wire cover is configured to be coupled to the connector housing only when all of the terminal modules are fully loaded into the corresponding module cavities.

12. The electrical connector of claim 1, wherein the track is an upper track proximate to a top of the connector housing, the connector housing further comprising a lower track proximate to a bottom of the connector housing, the wire cover including an upper mounting bracket received in the upper track and a lower mounting bracket received in the lower track.

13. The electrical connector of claim 12, wherein the module blocking wall is located in the upper track to interface with the terminal modules.

14. The electrical connector of claim 1, further comprising a lever rotatably coupled to the connector housing and movable between an open position and a closed position, the lever configured to be securely coupled to the mating electrical connector in the closed position, the wire cover including a locking lever configured to be coupled to the lever to retain the lever in the closed position.

15. The electrical connector of claim 14, wherein the locking lever is slidable between a locked position and an unlocked position, the locking lever engaging the lever in the locked position to hold the lever in the closed position.

16. An electrical connector comprising:

a connector housing including a mating end at a first end of the connector housing configured to be mated with a mating electrical connector, the connector housing including module cavities separated by separating walls, the connector housing including a track at a second end of the connector housing;

a lever rotatably coupled to the connector housing and movable between an open position and a closed position, the lever configured to be securely coupled to the mating electrical connector in the closed position;

terminal modules received in the corresponding module cavities, each terminal module including a module housing having terminal channels, each terminal module including terminals received in corresponding terminal channels, the terminals being terminated to ends of wires extending from a end of the corresponding module housing; and a wire cover coupled to the track at the second end of the connector housing, the wire cover including a wire cavity receiving the wires from the terminal modules, the wire cover having a wire exit, the wire cover directing the wires to the wire exit, the wire cover including a module blocking wall positioned along the terminal modules to block removal of the terminal modules from the corresponding module cavities, the wire cover including a locking lever configured to be coupled to the lever to retain the lever in the closed position.

17. The electrical connector of claim 16, wherein the locking lever is slidable between a locked position and an unlocked position, the locking lever engaging the lever in the locked position to hold the lever in the closed position.

18. The electrical connector of claim 16, wherein the module blocking wall forward biases the terminal modules in the module cavities.

19. The electrical connector of claim 16, wherein each module housing includes a bias bump at the end of the module housing, the module blocking wall engaging the bias bump to forward bias the terminal module in the module cavity.

20. An electrical connector system comprising:

a first electrical connector coupled to a second electrical connector;

the first electrical connector including a first connector housing including a mating end at a first end of the first connector housing for mating with the second electrical connector, the first connector housing including first module cavities separated by first separating walls, the first connector housing including a first track at a second end of the first connector housing, the first electrical connector including first terminal modules received in the corresponding first module cavities, each first terminal module including a first module housing having first terminal channels, each first terminal module including first terminals received in corresponding first terminal channels, the first terminals being terminated to ends of first wires extending from a end of the corresponding first module housing, and the first electrical connector including a first wire cover coupled to the first track at the second end of the first connector housing, the first wire cover including first a wire cavity receiving the first wires from the first terminal modules, the first wire cover having a first wire exit, the first wire cover directing the first wires to the first wire exit, the first wire cover including a first module blocking wall positioned along the first terminal modules to block removal of the first terminal modules from the corresponding first module cavities; and the second electrical connector including a second connector housing including a mating end at a first end of the second connector housing for mating with the first electrical connector, the second connector housing including second module cavities separated by second separating walls, the second connector housing including a second track at a second end of the second connector housing, the second electrical connector including second terminal modules received in the corresponding second module cavities, each second terminal module including a second module housing having second terminal channels, each second terminal module including second terminals received in corresponding second terminal channels, the second terminals mated with the corresponding first terminals, the second terminals being terminated to ends of second wires extending from a end of the corresponding second module housing, and the second electrical connector including a second wire cover coupled to the second track at the second end of the second connector housing, the second wire cover including second a wire cavity receiving the second wires from the second terminal modules, the second wire cover having a second wire exit, the second wire cover directing the second wires to the second wire exit, the second wire cover including a second module blocking wall positioned along the second terminal modules to block removal of the second terminal modules from the corresponding second module cavities.

* * * * *